(12) United States Patent
Oh et al.

(10) Patent No.: US 9,963,543 B2
(45) Date of Patent: May 8, 2018

(54) HIGHLY HEAT-RESISTANT AND HIGHLY TRANSPARENT POLYCARBONATE ESTER, AND PREPARATION METHOD THEREFOR

(71) Applicant: SK CHEMICALS CO., LTD., Seongnam-si, Gyeonggi-do (KR)

(72) Inventors: Kwang Sei Oh, Seoul (KR); Il-Hoon Cha, Seoul (KR); Ji-hoon Kim, Seoul (KR)

(73) Assignee: SK CHEMICALS CO., LTD., Seongnam-si, Gyeonggi-do (KR)

( * ) Notice: Subject to any disclaimer, the term of this patent is extended or adjusted under 35 U.S.C. 154(b) by 0 days. days.

(21) Appl. No.: 14/903,401

(22) PCT Filed: Jul. 24, 2014

(86) PCT No.: PCT/KR2014/006755
§ 371 (c)(1),
(2) Date: Jan. 7, 2016

(87) PCT Pub. No.: WO2015/012619
PCT Pub. Date: Jan. 29, 2015

(65) Prior Publication Data
US 2016/0152767 A1 Jun. 2, 2016

(30) Foreign Application Priority Data
Jul. 24, 2013 (KR) .......................... 10-2013-0087638

(51) Int. Cl.
*C08G 63/66* (2006.01)
*C08G 63/78* (2006.01)
*C08G 63/64* (2006.01)
*C08G 63/672* (2006.01)

(52) U.S. Cl.
CPC ............ *C08G 63/66* (2013.01); *C08G 63/64* (2013.01); *C08G 63/672* (2013.01); *C08G 63/78* (2013.01)

(58) Field of Classification Search
CPC ...... C08G 63/64; C08G 63/66; C08G 63/672; C08G 63/78
See application file for complete search history.

(56) References Cited

U.S. PATENT DOCUMENTS

| 8,962,770 | B2 | 2/2015 | de Brouwer et al. | |
| 2008/0015331 | A1* | 1/2008 | Terado | C08G 63/64 528/271 |
| 2010/0105854 | A1 | 4/2010 | Miyake et al. | 528/27 |
| 2010/0184884 | A1 | 7/2010 | Miyake et al. | 523/452 |
| 2011/0003101 | A1 | 1/2011 | Fuji et al. | |
| 2011/0160422 | A1* | 6/2011 | Kamps | C08L 69/00 528/201 |
| 2012/0041169 | A1 | 2/2012 | Fuertes et al. | |

FOREIGN PATENT DOCUMENTS

| EP | 2 123 692 A1 | 11/2009 | ............ C08G 64/02 |
| JP | 2013-515841 A | 5/2013 | |
| KR | 1019970009333 B1 | 6/1997 | |

(Continued)

OTHER PUBLICATIONS

Yoon et al "Advanced Polymerization and Properties of Biobased High Tg polyester of Isosorbide and 1,4-Cyclohexanedicarboxylic Acid through in Situ Acetylation", Macromolecules, Apr. 3, 2013, pp. 2930-2940.*

(Continued)

*Primary Examiner* — Ling Choi
*Assistant Examiner* — Gennadiy Mesh
(74) *Attorney, Agent, or Firm* — Harness, Dickey & Pierce, P.L.C.

(57) ABSTRACT

Disclosed is a bio-based polycarbonate ester comprising: (i) repeat unit 1 obtained from a condensation reaction of 1,4:3,6-dianhydrohexitol and carbonate; and (ii) repeat unit 2 obtained from a condensation reaction of 1,4:3,6-dianhydrohexitol and 1,4-cyclohexanedicarboxylate; and a preparation method for the bio-based polycarbonate ester, comprising the steps of: (1) preparing a compound 1,4-diphenyl-cyclohexanedicarboxylate through a trans-esterification or esterification reaction of a compound represented by formula 2

$$\text{(RO} \overset{\displaystyle O}{\underset{\displaystyle }{\|}} \text{—} \bigcirc \text{—} \overset{\displaystyle O}{\underset{\displaystyle }{\|}} \text{OR)}$$

and phenol; and (2) preparing a compound comprising a repeat unit represented by formula 1 through a polycarbonate melt polycondensation reaction of the 1,4-diphenyl-cyclohexanedicarboxylate prepared in step (1), a compound represented by formula 4

$$( R_1O \overset{\displaystyle O}{\underset{\displaystyle \|}{-}} C {-} OR_2 ),$$

and 1,4:3,6-dianhydrohexitol.

4 Claims, 3 Drawing Sheets

(56) References Cited

FOREIGN PATENT DOCUMENTS

KR      1020120121477 A    11/2012
WO    WO 2012/123267          9/2012    ............. C08G 63/18

OTHER PUBLICATIONS

Okada et al."Biodegradable Polymers Based on Renewable Resources",J Appl Polym Sci 86, pp. 872-880, 2002.*
Turner et al. "Amorphous and Crystalline Polyesters based on 1,4-Cyclohexanedimethanol", Modern Polyesters: Chemistry and Technology of Polyesters and Copolyesters. Edited by J. Scheirs and T. E. Long © 2003 John Wiley & Sons, Ltd ISBN: 0-471-49856-4.*
Fenouillot, F. et al., "Polymers from renewable 1,4:3,6-dianhydrohexitols (isosorbide, isomannide and isoidide): A review", Progress in Polymer Science, Oct. 2010, vol. 35, No. 5, pp. 578-622.
Extended European Search Report (EESR) dated Mar. 13, 2017 in European Application No. 14829080.2.
Japanese Office Action from corresponding Japanese Patent Application No. 2016-529713 dated Jan. 30, 2018.

* cited by examiner

HIGHLY HEAT-RESISTANT AND HIGHLY TRANSPARENT POLYCARBONATE ESTER, AND PREPARATION METHOD THEREFOR

FIELD OF THE INVENTION

The present invention relates to a polycarbonate ester having high heat resistance and transparency, and a preparation method thereof. More specifically, it relates to a biomass-based polycarbonate ester having repeating units which are obtained from a reaction of 1,4:3,6-dianhydrohexitol and a carbonate or an 1,4-cyclohexanedicarboxylate.

BACKGROUND OF THE INVENTION

Unlike conventional resources based on petrochemical industry, 1,4:3,6-dianhydrohexitol is a bio-based material derived from a biomass, i.e., a renewable resource containing polysaccharide as its components such as corn, wheat, sugar, and the like. Particularly, in case of a bioplastic containing a bio-based material, carbon dioxide ($CO_2$) produced during waste disposal processes after the use of a bioplastic can be reused for the growth of biomass, and thus the bioplastic has been noticed as a carbon dioxide reduction material to prevent global warming, which is a serious worldwide issue.

1,4:3,6-Dianhydrohexitol exists in three different forms of stereoisomers, which has different chemical properties depending on the difference in the relative configuration of two hydroxyl groups present therein: isomannide (as shown in formula a below, mp: 81-85° C.), isosorbide (as shown in formula b below, mp: 61-62° C.), and isoidide (as shown in formula c below, mp: 64° C.). Particularly, in a case where 1,4:3,6-dianhydrohexitol is used as a monomer material of polycarbonate which is one of representative engineering plastics, the polycarbonate thus prepared can have good thermal and optical properties owing to molecular structural characteristics of 1,4:3,6-dianhydrohexitol, i.e., rigidity and saturated heterocyclic structure, together with the advantages of a bioplastic.

Since 1,4-dimethyl-cyclohexane dicarboxylate (hereinafter referred to as DMCD) or 1,4-cyclohexanedicarboxylic acid (hereinafter referred to as CHDA), a hydrolysis product of DMCD, has a cyclohexane ring structure in the center of the molecule. Thus, if these materials are introduced into a polymer chain, they improve the weatherability and UV stability of the polymer, and also allow the polymer to have excellent material properties, such as gloss retention, yellowing resistance, hydrolytic stability, corrosion resistance, and chemical resistance, owing to its unique combination of flexibility and hardness in the molecular structure.

Poly(1,4-cyclohexylidene 1,4-cyclohexanedicarboxylate) (hereinafter referred to as PCCD), a DMCD/CHDM homopolyester, is an example of commercially available polymer materials developed by using DMCD. Owing to its superior properties such as weatherability, chemical resistance, flowability, and a low refractive index, PCCD has been used to develop a polycarbonate/PCCD alloy (product name: Xyrex) by DuPont (USA) in order to improve transparency of polycarbonate.

A commercial manufacturing process of polycarbonate can be divided into two processes: solution polymerization and melt polycondensation. Unlike the solution polymerization process where phosgene is used as a source material for carbonate, diphenyl carbonate (hereinafter referred to as DPC) is used in the melt polycondensation process. Thus, raw materials used in the conventional melt polycondensation process generally include DPC and bisphenol A (hereinafter referred to as BPA), which is a diol; and a transesterification reaction of BPA with DPC produces phenol as a byproduct of the melt polycondensation.

Meanwhile, it is required to convert a functional group present in DMCD or CHDA into another functional group, which may cause the production of phenol as a byproduct via a transesterification reaction with diol, in order to use DMCD or CHDA in the polycarbonate melt polycondensation. For example, dimethyl ester of DMCD or dicarboxylic acid of CHDA needs to be converted into diphenyl ester. Thus, an example of diphenyl ester derivatives of DMCD or CHDA which can be used for the polycarbonate melt polycondensation is 1,4-diphenyl-cyclohexanedicarboxylate (hereinafter referred to as DPCD), and is synthesized by a reaction of DMCD or CHDA with phenol, as represented by Reaction Scheme 1 below:

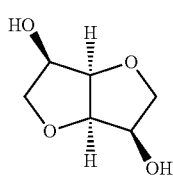

[Formula a]

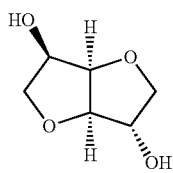

[Formula b]

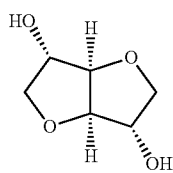

[Formula c]

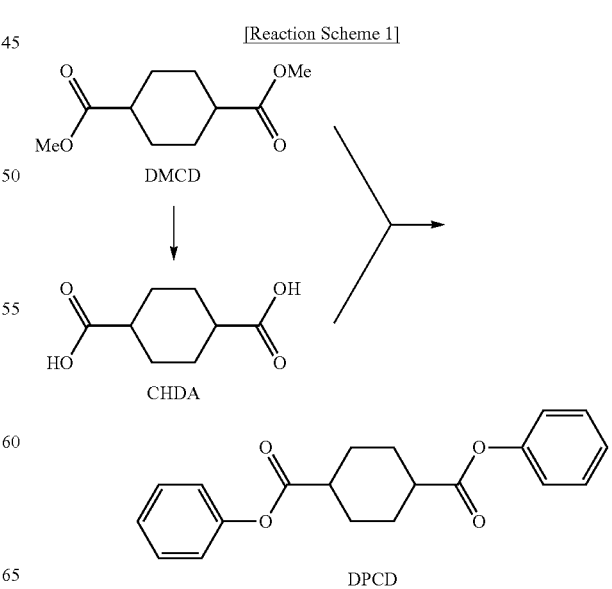

[Reaction Scheme 1]

In general, in case of 1,4-dimethyl-terephthalate (a tertiary dimethyl ester) and terephthalic acid (a diacid), a reaction does not occur therebetween if either one of their functional groups, i.e., one of acid and alcohol, is not activated. In case of DMCD (a secondary dimethyl ester) and CHDA (a diacid), however, they can react with phenol in a molten state, and thus it is easier to conduct DPCD synthesis.

The present invention employs DPCD, which is used as a material for forming an ester bond in the polymer chain, to provide an isosorbide-based polycarbonate ester (or polyester carbonate). The polycarbonate ester thus obtained is a novel bioplastic having high heat resistance and transparency whose properties and forming processability can be adjusted according to its needs by varying the DPCD content. The bio-based polycarbonate ester according to the present invention can exhibit the same level of heat resistance as compared to the conventional bioplastic disclosed in US 2011/0003101 A1, even comprising a less amount of isosorbide, and thus have a relative advantage in terms of production costs.

SUMMARY OF THE INVENTION

Therefore, it is an object of the present invention to provide a bio-based polycarbonate ester having high heat resistance and transparency with a high degree of polymerization and good mechanical properties, comprising a rigid polymer repeating unit with no BPA causing an environmental hormone, which is useful in various applications, e.g., glass alternative for automobile, optical lens and film, feeding bottle, food container, etc. In addition, it is another object of the present invention to provide a preparation method of the bio-based polycarbonate ester.

In accordance with one aspect of the present invention, there is provided a bio-based polycarbonate ester comprising: (i) Repeating Unit 1 obtained from a condensation reaction of 1,4:3,6-dianhydrohexitol and a carbonate; and (ii) Repeating Unit 2 obtained from a condensation reaction of 1,4:3,6-dianhydrohexitol and an 1,4-cyclohexanedicarboxylate.

In accordance with another aspect of the present invention, there is provided a method for manufacturing a bio-based polycarbonate ester comprising the steps of:

(1) subjecting a compound of formula 2 and phenol to a transesterification or esterification reaction to obtain a compound of formula 3; and (2) subjecting the compound of formula 3 obtained in Step (1), a compound of formula 4, and 1,4:3,6-dianhydrohexitol to a polycarbonate melt polycondensation reaction to prepare a compound comprising a repeating unit of formula 1:

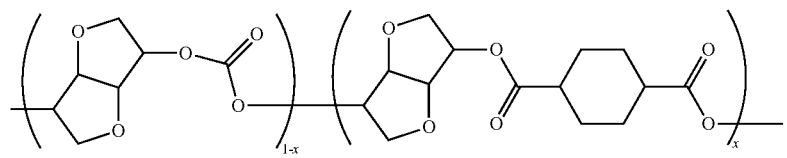

[Formula 1]

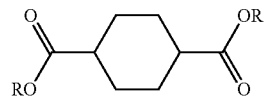

[Formula 2]

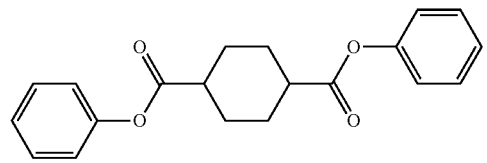

[Formula 3]

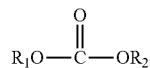

[Formula 4]

wherein, in formula 1, x satisfies 0<x<1, in formula 2, R is methyl or hydrogen, and, in formula 4, $R_1$ and $R_2$ are each independently an aliphatic group having 1 to 18 carbon atoms or an aromatic group having 6 to 20 carbon atoms which may have an optional substituent.

The bio-based polycarbonate ester according to the present invention exhibits high heat resistance and transparency, and has an advantage that properties deriving from (i) Repeating Unit 1 obtained from a condensation reaction of 1,4:3,6-dianhydrohexitol and a carbonate, and (ii) Repeating Unit 2 obtained from a condensation reaction of 1,4:3,6-dianhydrohexitol and an 1,4-cyclohexanedicarboxylate can be controlled by regulating the contents thereof. Thus, the inventive bio-based polycarbonate ester can be useful in various applications such as glass alternative for automobile, optical lens and film, feeding bottle, food container, etc.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
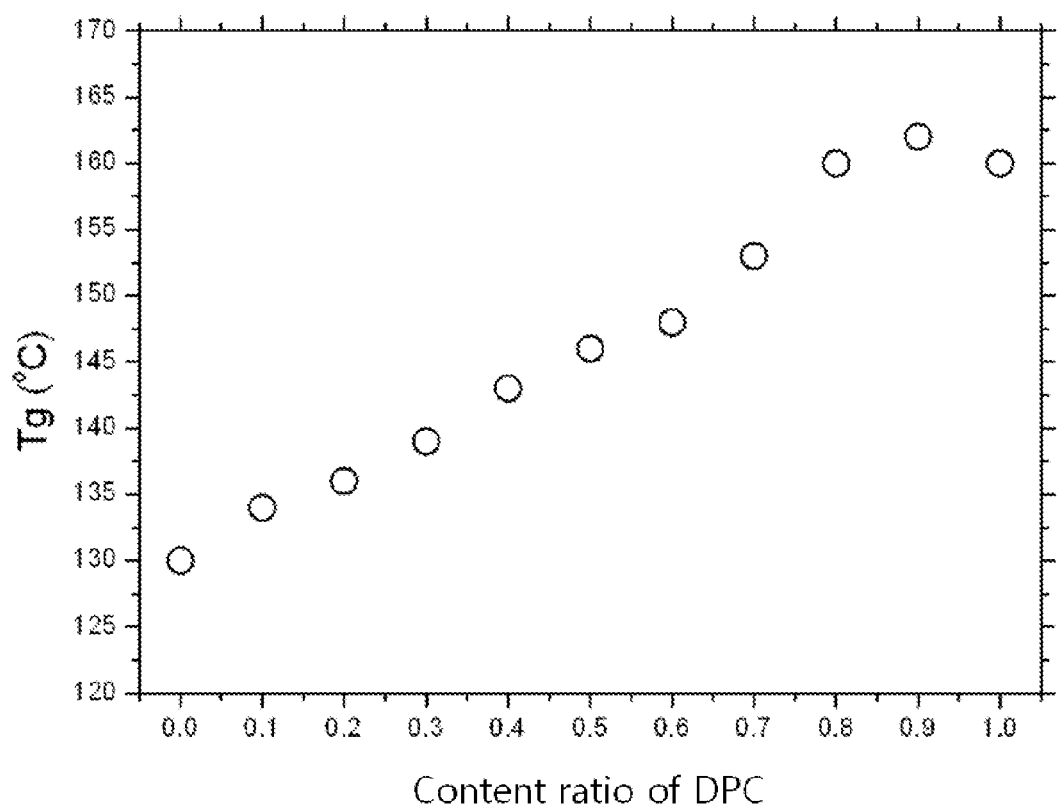
FIG. 1 is a graph showing the change in glass transition temperature (Tg) of polymers depending on the content ratio of DPC.

Hereinafter, the present invention will be described in detail.

A bio-based polycarbonate according to the present invention comprises (i) Repeating Unit 1 obtained from a condensation reaction of 1,4:3,6-dianhydrohexitol and a carbonate, and (ii) Repeating Unit 2 obtained from a condensation reaction of 1,4:3,6-dianhydrohexitol and an 1,4-cyclohexanedicarboxylate, and may comprises a repeating unit of formula 1 below:

[Formula 1]

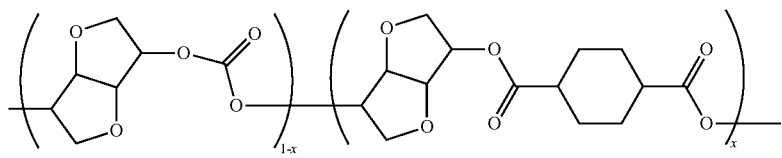

wherein x satisfies 0<x<1.

In the repeating unit of formula 1 above, the ratio of cis/trans cyclohexanedicarboxylate unit may be 1/99% to 99/1%, preferably 20/80% to 80/20%, more preferably 30/70% to 70/30%.

When the content of trans cyclohexanedicarboxylate unit increases, heat resistance improves owing to an increase in the glass transition temperature (Tg) although transparency relatively decreases. In contrast, if there is a decrease in the content of trans cyclohexanedicarboxylate unit, transparency improves while there is a reduction in heat resistance due to a decrease in Tg. Thus, the ratio of cis/trans cyclohexanedicarboxylate unit may be controlled within a suitable range, preferably 20/80% to 80/20%, more preferably 30/70% to 70/30%, so that desirable heat resistance and transparency can be obtained.

The 1,4:3,6-dianhydrohexitol may be isomannide, isosorbide or isoidide, preferably isosorbide.

The bio-based polycarbonate ester according to the present invention may be obtained by a preparation method comprising the steps of:

(1) subjecting a compound of formula 2 and phenol to a transesterification or esterification reaction to obtain a compound of formula 3; and (2) subjecting the compound of formula 3 obtained in Step (1), a compound of formula 4, and 1,4:3,6-dianhydrohexitol to a polycarbonate melt polycondensation reaction to prepare a compound comprising a repeating unit of formula 1:

wherein, in formula 1, x satisfies 0<x<1,
in formula 2, R is methyl or hydrogen, and,
in formula 4, $R_1$ and $R_2$ are each independently an aliphatic group having 1 to 18 carbon atoms or an aromatic group having 6 to 20 carbon atoms which may have an optional substituent.

In the definitions of $R_1$ and $R_2$, examples of the aliphatic group having 1 to 18 carbon atoms is $C_{1-18}$ alkyl, $C_{2-18}$ alkenyl, $C_{2-18}$ alkynyl, $C_{3-18}$ cycloalkyl and the like, and examples of the aromatic group having 6 to 20 carbon atoms is $C_{6-20}$ aryl and the like. The $R_1$ and $R_2$ may each independently contains one or more heteroatoms selected from the group consisting of N, S and O atoms. The $R_1$ and $R_2$ may each independently have one or more substituents. The substituents of $R_1$ and $R_2$ may be each independently $C_{1-10}$ alkyl or $C_{6-10}$ aryl which may contain one or more heteroatoms selected from the group consisting of N, S and O atoms.

In Step (1), the compound of formula 3, i.e., 1,4-diphenyl-cyclohexanedicarboxylate, is obtained by subjecting the compound of formula 2 and phenol to a transesterification or esterification reaction.

Specifically, dimethyl ester of DMCD (the compound of formula 2 wherein R is methyl) or dicarboxylic acid of CHDA (the compound of formula 2 wherein R is H) is converted into diphenyl ester through Step (1) above, and thereby forming 1,4-diphenyl-cyclohexanedicarboxylate which can be reacted with diol to produce phenol as a byproduct via a transesterification reaction in the subsequent Step (2).

In case of DMCD and CHDA, since these compounds can react with phenol in a molten state, it is easy to manufacture DPCD.

Various compounds including primary, secondary, tertiary dicarboxylate or dicarboxylic acid may be also used together, in addition to the compound of formula 2, depending on the desired properties, as a starting material for forming an ester bond in the polymer chain of the present invention. Such compounds may be converted into diphenyl ester by the reaction with phenol, and then used for polycarbonate melt polycondensation, together with the compound of formula 3.

[Formula 1]

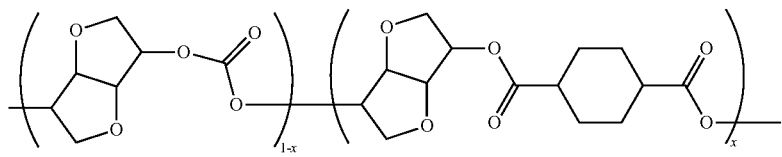

[Formula 2]

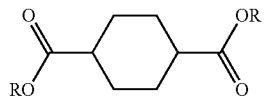

[Formula 3]

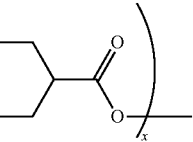

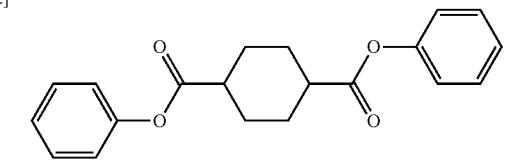

[Formula 4]

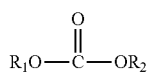

In this case, when the amount of diphenyl ester compound used other than the compound of formula 3 is z, the amount of the compound of formula 3 is 1−z. As such, z satisfies 0≤z<1.

The diphenyl ester compound other than the compound of formula 3 may be one kind or a mixture of two or more kinds.

In order to give the bio-based polycarbonate ester of the present invention high heat resistance and transparency, and improved weatherability and UV stability, the diphenyl ester compound other than the compound of formula 2 may be dicarboxylate or dicarboxylic acid having a single or fused saturated homocycle or heterocycle in its molecular center, for example, at least one dicarboxylate or dicarboxylic acid compound selected from the group consisting of: dicarboxylate such as tetrahydro-2,5-dimethyl-furandicarboxylate, 1,2-dimethyl-cyclohexanedicarboxylate, 1,3-dimethyl-cyclohexanedicarboxylate, decahydro-2,4-dimethyl-naphthalenedicarboxylate, decahydro-2,5-dimethyl-naphthalenedicarboxylate, decahydro-2,6-dimethyl-naphthalenedicarboxylate, decahydro-2,7-dimethyl-naphthalenedicarboxylate, and the like; and dicarboxylic acid such as tetrahydro-2,5-furandicarboxylic acid, 1,2-cyclohexanedicarboxylic acid, 1,3-cyclohexanedicarboxylic acid, decahydro-2,4-naphthalenedicarboxylic acid, decahydro-2,5-naphthalenedicarboxylic acid, decahydro-2,6-naphthalenedicarboxylic acid, decahydro-2,7-naphthalenedicarboxylic acid, and the like. Such compounds are preferably decahydro-2,6-dimethyl-naphthalenedicarboxylate or decahydro-2,6-naphthalenedicarboxylic acid and, a compound obtainable from a bio-based material, tetrahydro-2,5-dimethyl-furandicarboxylate or tetrahydro-2,5-furandicarboxylic acid.

The phenyl ester substitution reaction may be conducted at 150 to 250° C. under a normal pressure, or at 150 to 300° C. under an elevated pressure of 0.1 to 10 bar, preferably 0.5 to 5 bar. The reaction time may be 5 minutes to 48 hours, preferably 10 minutes to 24 hours.

Phenol may be used in an amount of 2 to 50 times, preferably 4 to 20 times of the total mole number of the compound of formula 2, i.e., 2 to 50 times, preferably 4 to 20 times of the stoichiometric amount of phenol required for esterification of all methyl ester (when R is methyl) or carboxylic acid (when R is H) of the compound of formula 2. If the amount of phenol used is not within said range, the final yield of the compound of formula 3 may be reduced.

In Step (2), the compound of formula 3 obtained in Step (1), the compound of formula 4, and 1,4:3,6-dianhydrohexitol are subjected to a polycarbonate melt polycondensation to obtain the compound comprising the repeating unit of formula 1.

In Step (2), the reaction of 1,4:3,6-dianhydrohexitol with the compound of formula 4 forms a carbonate bond (Repeating Unit 1) and the reaction of 1,4:3,6-dianhydrohexitol with the compound of formula 3 forms an ester bond (Repeating Unit 2). A repeating unit containing these bonds is represented by formula 1 above.

If the amount of 1,4:3,6-dianhydrohexitol is 1 and the amount of the compound of formula 3 is x, the amount of compound of formula 4 used can be determined as 1−x, as shown in Reaction Scheme 2 below:

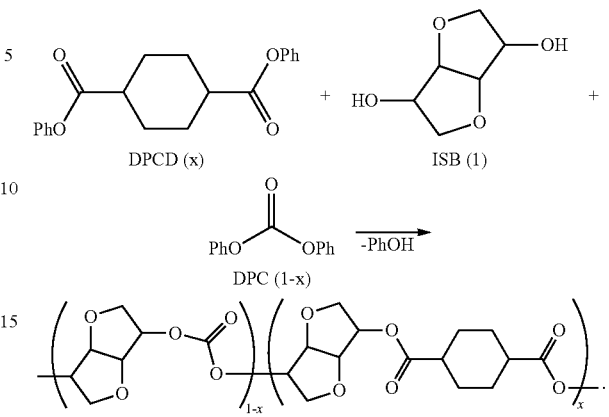

[Reaction Scheme 2]

For example, in a case where a melt polycondensation is carried out by using isosorbide (1,4:3,6-dianhydrohexitol) and diphenyl carbonate (the compound of formula 4) so that the amount of compound of formula 3 is 0, isosorbide homopolycarbonate (Tg 160° C.) is produced. When the amount of the compound of formula 3 increases, the amount of ester bond in the polymer chain increases as well. If the amount of the compound of formula 3 becomes 1, a melt polycondensation only takes place between isosorbide and the compound of formula 3, thereby producing homopolyester (Tg 130° C.; *Macromolecules*, 2013, 46, 2930). FIG. 1 illustrates the change in Tg of the polymers depending on the amount of DPC.

In conclusion, the ratio of carbonate and ester bonds in the polymer chain varies depending on the added amount of the compound of formula 3. If carbonate and ester bonds coexist in the polymer chain, the polycarbonate ester of the present invention has a higher heat resistance as compared to the copolymer polycarbonate formed between isosorbide and 1,4-cyclohexanedimethanol as disclosed in US 2011/0003101 A1, although comprising the same amount of isosorbide. Polycarbonate generally shows high heat resistance and good mechanical properties when compared with polyester, but has relatively poor chemical resistance, residual stress, and molding cycle time. The polycarbonate ester comprising both carbonate and ester bonds in a single chain, however, redresses the drawbacks of each bond type and also provides some advantages.

The 1,4:3,6-dianhydrohexitol may be isomannide, isosorbide or isoidide, preferably isosorbide.

Meanwhile, it is very important to maintain a high purity of 1,4:3,6-dianhydrohexitol which is used in the melt polycondensation, in order to obtain a high degree of polymerization for high heat resistance and transparency, as well as excellent mechanical properties of the bio-based polycarbonate ester.

The 1,4:3,6-dianhydrohexitol may be used in the form of powder, flake or in an aqueous solution. However, an excessive exposure to air may cause oxidation and discoloration, and it may lead to dissatisfying color and molecular weight of the final polymer. Thus, the time of exposure to air must be minimized, and the compound must be stored with a deoxidizing agent such as an oxygen absorber after the exposure. Particularly, it is very important to remove impurities obtained in multi-step preparation process of 1,4:3,6-dianhydrohexitol. During the purification of 1,4:3,6-dianhydrohexitol by distillation, it is necessary to remove a liquid component containing a trace-level of acid which can be removed by an initial separation, and an alkali metal component which be removed by a residue separation. Each of these two impurities should be kept at 10 ppm or lower, preferably 5 ppm or lower, more preferably 3 ppm or lower.

Examples of the compound of formula 4 may be at least one compound selected from a group consisting of dimethyl carbonate, diethyl carbonate, di-t-butyl carbonate, diphenyl carbonate, and a substituted diphenyl carbonate (e.g., ditolyl carbonate). Since the polycarbonate melt polycondensation reaction is carried out under a reduced pressure condition, diphenyl carbonate and a substituted diphenyl carbonate are preferred.

In Step (2) above, besides 1,4:3,6-dianhydrohexitol, any kind of a diol compound may also be used, without limitation. Various compounds including primary, secondary, or tertiary diol compounds may be used in combination with 1,4:3,6-dianhydrohexitol. In this case, when the amount of diol compound used other than 1,4:3,6-dianhydrohexitol is referred to as y, the added amount of 1,4:3,6-dianhydrohexitol is 1−y.

Particularly, in a case where a petrochemical-based diol compound is used, the final bio-based content (ASTM-D6866) contained in the polymer which is derived from 1,4:3,6-dianhydrohexitol may be at least 1%, wherein y satisfies $0 \leq y < 0.99$. In other words, the additional diol compound may be used in an amount of less than 99 mol %, based on 100 mol % of 1,4:3,6-dianhydrohexitol.

In this step, it is preferred to use a diol compound having a single or fused saturated homocycle or heterocycle in its molecular center in order to give the polycarbonate ester high heat resistance and transparency, and improved weatherability and UV stability. In general, heat resistance increases when the size of a ring is big and the hydroxyl groups are in a symmetrical structure. However, optical properties are not dependent on the ring size and the position of the hydroxyl groups, but rather vary in accordance with the properties of each material. When the size of the ring becomes big, it becomes difficult to use the compound for commercial production and utilization. The diol may be selected from the group consisting of 1,2-cyclohexanedimethanol, 1,3-cyclohexanedimethanol, 1,4-cyclohexanedimethanol, tricyclodecandimethanol, 3,9-bis(1,1-dimethyl-2-hydroxyethyl)-2,4,8,10-tetraoxaspiro[5.5]undecane, 2,2-bis(4-hydroxycyclohexyl)propane, and tetrahydro-2,5-furandimethanol that is obtainable from a bio-based material. The preferable diols are 1,4-cyclohexanedimethanol, 2,2-bis(4-hydroxycyclohexyl)propane, and tetrahydro-2,5-furandimethanol.

The cis/trans ratio of the compound of formula 3 may be 1/99% to 99/1%, preferably 10/90% to 90/10%, more preferably 20/80% to 80/20%. Additionally, the cis/trans ratio of cyclohexanedicarboxylate in the repeating unit of formula 1 may be 1/99% to 99/1%, preferably 20/80% to 80/20%, more preferably 30/70% to 70/30%.

When the content of trans cyclohexanedicarboxylate unit increases, heat resistance improves owing to an increase in Tg while transparency relatively decreases. In contrast, if the trans content decreases, transparency improves while heat resistance reduces due to a decrease in Tg. Thus, the ratio of cis/trans cyclohexanedicarboxylate unit is preferably controlled within 20/80% to 80/20%, more preferably 30/70% to 70/30%, so that desirable heat resistance and transparency can be obtained.

In the melt polycondensation of Step (2), when the amount of 1,4:3,6-dianhydrohexitol used is 1, the total amount of the compounds of formula 3 and formula 4 may be 0.7 to 1.3 times, preferably 0.9 to 1.1 times, more preferably 0.95 to 1.05 times of the amount of 1,4:3,6-dianhydrohexitol. The temperature of the melt polycondensation reaction may be elevated at a rate of 0.1 to 10° C./min, preferably 0.2 to 5° C./min, more preferably 0.5 to 2° C./min. The reaction temperature may be 120 to 320° C., preferably 150 to 290° C., more preferably 180 to 270° C., and the reaction time may be 1 to 10 hours, preferably 3 to 8 hours.

Meanwhile, phenol produced as a byproduct during the melt polycondensation should be distilled out of the reactor in order to shift the reaction equilibrium towards polycarbonate ester. In particular, if the rate of temperature elevation goes out of said range, the phenol may evaporate or sublime together with the raw materials. The bio-based polycarbonate ester may be prepared via a batch or continuous process.

The method for manufacturing a bio-based polycarbonate ester according to the present invention may additionally use a catalyst for increasing the reactivity of the melt polycondensation reaction. Any conventional alkali metal and/or alkali earth metal catalyst commonly used for the polycarbonate melt polycondensation may be used as such catalyst. The catalyst may be used in combination with a basic ammonium or amine, a basic phosphorous, or a basic boron compound. However, it is preferable to use the catalyst alone. Examples of the alkali metal catalysts may include LiOH, NaOH, KOH, CsOH, $Li_2CO_3$, $Na_2CO_3$, $K_2CO_3$, $Cs_2CO_3$, LiOAc, NaOAc, KOAc, CsOAc, and the like, and examples of the alkali earth metal catalysts may include $Ca(OH)_2$, $Ba(OH)_2$, $Mg(OH)_2$, $Sr(OH)_2$, $CaCO_3$, $BaCO_3$, $MgCO_3$, $SrCO_3$, $Ca(OAc)_2$, $Ba(OAc)_2$, $Mg(OAc)_2$, $Sr(OAc)_2$, and the like. These alkali metal and/or alkali earth metal catalysts may be used alone or in combination of two or more.

The catalyst may be used in an amount of 0.1 to 30 μmol, preferably 0.5 to 25 μmol, more preferably 0.5 to 20 μmol, per mole of the total amount of the diol (1,4:3,6-dianhydrohexitol and an additional diol) used in the melt polycondensation reaction. Although the catalyst may be employed at any time regardless of the progress of the melt polycondensation reaction, it is preferable to introduce the catalyst before the initiation of the melt polycondensation reaction. When the amount of the catalyst used is less than 0.1 μmol per mole of the total amount of the diol, it is difficult to obtain a targeted degree of polymerization. If the amount of the catalyst exceeds 30 μmol it causes side reactions and thus directly affects deterioration of target properties such as reduced transparency.

In addition, in the method for manufacturing a bio-based polycarbonate ester according to the present invention, as the melt polycondensation reaction takes place in a molten state which has a high viscosity due to the increase in polymerization level, it is necessary to quickly remove byproducts from the molten state. Also, temperature elevation and pressure reduction take place stepwise in order to promote the rate of the polymerization reaction.

After the raw materials are introduced, the first part of the reaction may be carried out at a temperature of 130 to 250° C., preferably 140 to 240° C., more preferably 150 to 230° C., for 0.1 to 10 hours, preferably 0.5 to 3 hours. When the pressure is reduced in said temperature range, the reduced pressure condition may be 5 to 700 Torr, preferably 10 to 600 Torr.

The second part of the reaction may be carried out at a temperature of 210 to 290° C., preferably 220 to 280° C., more preferably 230 to 270° C., for 0.1 to 10 hours, preferably 0.5 to 3 hours. When the pressure is reduced in said temperature range, the reduced pressure condition may be 20 Torr or less, preferably 10 Torr or less.

Additionally, the method for manufacturing a bio-based polycarbonate ester according to the present invention may further comprise various additives, if necessary. For example, the employable additive may include an antioxidant and a thermal stabilizer such as hindered phenol, hydroquinone, phosphite, and a substituted compound thereof; a UV-absorber such as resorcinol, salicylate, etc.; a color-protecting agent such as phosphite, hydrophosphite, etc.; and a lubricant such as montanic acid, stearyl alcohol, etc. Also, a dye and pigment may be used as a colorant; carbon black may be used as a conductive agent, colorant or nucleation agent; and a flame retardant, a plasticizer, an antistatic agent and the like may also be used. As such, the aforementioned additives may be included in an amount that does not cause adverse effects on the final properties of the polymer, especially on transparency.

The bio-based polycarbonate ester comprising a repeating unit of formula 1 prepared by the method for manufacturing a polycarbonate ester according to the present invention may have a final intrinsic viscosity (hereinafter referred to as IV) of 0.3 to 2.0 dL/g.

Hereinafter, the present invention is described more specifically by following examples. However, these examples are provided only for illustration purposes, and the present invention is not limited thereto.

Preparation Example 1: Synthesis of DPCD by Using CHDA 100 g (0.58 mol) of CHDA (SK Chemicals) with a cis/trans ratio of 95/5%, 218 g (2.32 mol) of phenol, 0.1 g (0.55 mmol) of $Zn(OAc)_2$ catalyst, and a magnetic stirrer were introduced into a 500 mL one-neck flask. A distillation head, a thermometer, and a cooling condenser were equipped to the flask, and the flask was heated to 200° C. A reaction was carried out at the same temperature for 24 hours, and water which was generated as a byproduct of the reaction was disposed from the flask. Upon completion of the reaction, the reactant thus obtained was cooled down to room temperature, and excessively introduced phenol was removed therefrom by using an evaporator. The solid compound thus obtained was added with excessive water, and mechanically stirred to remove the residual phenol. After 24 hours vacuum drying at 90° C., 111 g of DPCD was obtained (yield: 59%). The cis/trans ratio had been changed to 55/45% as a result of the reaction with phenol under the said reaction conditions: the cis content was decreased, whereas the trans content was increased.

Preparation Example 2: Synthesis of DPCD by Using DMCD 100 g (0.50 mol) of DMCD (SK Chemicals) with a cis/trans ratio of 77/23%, 188 g (2.00 mol) of phenol, 100 mL of water, and 1.0 g (5.81 mmol) of p-toluensulfonic acid catalyst were introduced into a 500 mL one-neck flask, together with a magnetic stirrer. The flask was equipped with a cooling condenser, heated to 100° C., and refluxed under stirring for 10 hours. Upon completion of the reaction, the reactant thus obtained was cooled down to room temperature, and then water and phenol were removed therefrom by distillation. Subsequently, the remaining reactant was heated to 200° C., and the reaction was carried out at the same temperature for 24 hours, followed by disposing water which was generated as a byproduct of the reaction. Upon completion of the reaction, the reactant thus obtained was cooled down to room temperature, and excessively introduced phenol was removed therefrom by using an evaporator. The solid compound thus obtained was added with excessive water, and mechanically stirred to remove the residual phenol. After 24 hours vacuum drying at 90° C., 86 g of DPCD was obtained (yield: 53%). The cis/trans ratio had been changed to 52/48% as a result of the reaction with phenol under the said reaction conditions: the cis content was decreased, whereas the trans content was increased.

Example 1: Preparation of Bio-Based Polycarbonate Ester

Figure 2:
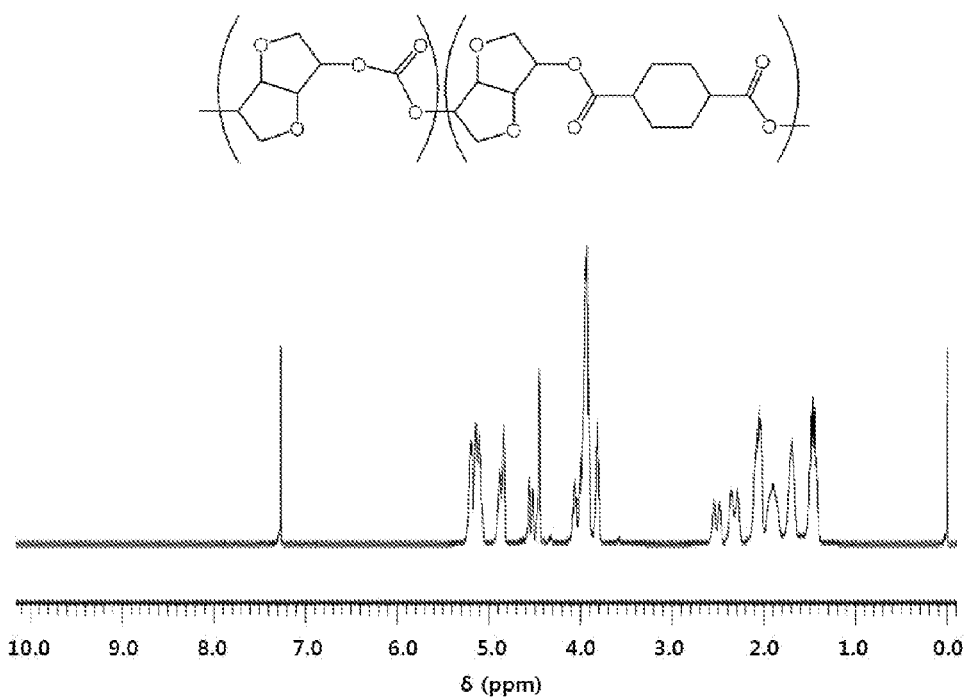
FIG. 2 is an $^1$H NMR spectrum of a bio-based polycarbonate ester prepared in Example 1.
Figure 3:
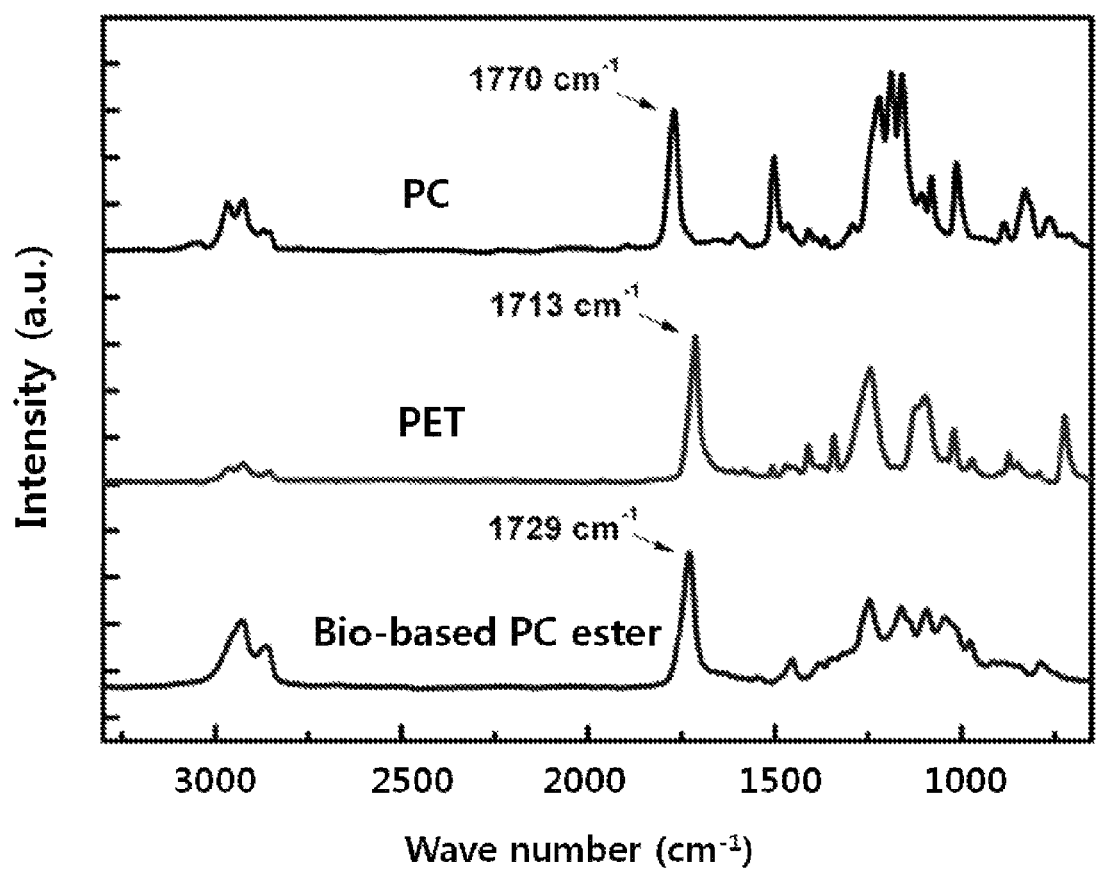
FIG. 3 is an IR spectrum of a bio-based polycarbonate ester prepared in Example 1.

A distillation head, a thermometer, a cooling condenser, and a mechanical stirrer were equipped to a 500 mL three-neck flask. 102.3 g (0.7 mol) of isosorbide (Roquette Freres), 97.3 g (0.3 mol) of DPCD obtained from Preparation Example 1, 85.7 g (0.4 mol) of DPC (Aldrich), and $5.9 \times 10^{-4}$ g ($1.8 \times 10^{-3}$ mmol) of cesium carbonate ($Cs_2CO_3$), as a catalyst, were added to the flask and the flask was heated to 150° C. Once the temperature reached 150° C., the pressure was reduced to 400 Torr, and the temperature was elevated to 190° C. over 1 hour. During the temperature elevation, phenol started to form as a byproduct of polymerization reaction. When the temperature reached 190° C., the pressure was reduced to 100 Torr, maintained for 20 minutes, and then the temperature was elevated to 230° C. over 20 minutes. Once the temperature reached 230° C., the pressure was reduced to 10 Torr, and then the temperature was elevated to 250° C. over 10 minutes. The pressure was reduced to 1 Torr or less at 250° C., and the reaction was continued until it reached a desired stirring torque. When the stirring torque reached the desired value, the reaction was terminated, and the temperature was cooled down to room temperature. The cis/trans ratio of the cyclohexanedicarboxylate unit in the polymer chain obtained as a final product had been changed to 40/60%. The cis content was decreased, whereas the trans content was increased, as compared to its starting material DPCD. The bio-based polycarbonate ester thus prepared had Tg of 143° C., and IV of 0.48 dL/g. The $^1$H NMR and IR spectrum of the final product are shown in FIGS. 2 and 3.

Comparative Example 1: Preparation of Bio-Based Polycarbonate Ester by Using CHDM A bio-based polycarbonate ester was prepared by using the same procedure as Example 1, except for using 10.1 g (0.07 mol) of CHDM (SK Chemicals) along with DPCD and DPC, and 92.1 g (0.63 mol) of isosorbide (Roquette Freres). The cis/trans ratio of the cyclohexanedicarboxylate unit in the polymer chain thus obtained as a final product had been changed to 38/62%. The bio-based polycarbonate ester thus prepared had Tg of 129° C., and IV of 0.51 dL/g.

Comparative Example 2: Preparation of Isosorbide Homopolycarbonate

An isosorbide homopolycarbonate was prepared by using the same procedure as Example 1, except for using 150.0 g (0.7 mol) of DPC (Aldrich), with no use of DPCD. The isosorbide homopolycarbonate thus obtained had Tg of 160° C., and IV of 0.49 dL/g.

Comparative Example 3: Preparation of Isosorbide/DPCD Homopolyester

A bio-based isosorbide/DPCD polyester was prepared by using the same procedure as Example 1, except for using 227.1 (0.7 mol) of DPCD with no use of DPC. The cis/trans ratio of the cyclohexanedicarboxylate unit in the polymer chain thus obtained as a final product had been changed to 36/64%. The bio-based polycarbonate ester thus prepared had Tg of 130° C., and IV of 0.46 dL/g.

Comparative Example 4: Preparation of DDDA Copolymerized Isosorbide Polycarbonate Ester A DDDA copolymerized isosorbide polycarbonate ester was prepared by using the same procedure as Example 1, except for using 32.2 g (0.14 mol) of dodecanedioic acid (hereinafter referred to as DDDA, Aldrich) instead of DPCD, and 120.0 g (0.56 mol) of DPC (Aldrich). The DDDA copolymerized isosorbide polycarbonate ester had Tg of 121° C., and IV of 0.34 dL/g.

Comparative Example 5: Preparation of Bio-Based Polycarbonate Ester with High Cis Content A bio-based polycarbonate ester was prepared by using the same procedure as Example 1, except for using 97.3 g (0.3 mol) of DPCD having a cis/trans ratio of 90/10%. The cis/trans ratio of the cyclohexanedicarboxylate unit in the polymer chain thus obtained as a final product had been changed to 85/15%. The bio-based polycarbonate ester thus prepared had Tg of 113° C., and IV of 0.37 dL/g.

<Light Transmittance Measurement>

The light transmittance of sheets prepared from the copolymerized samples obtained in Example 1 and Comparative Examples 1 to 5 in the visible range was measured by using a UV-VIS spectrometer in the range of 200 to 800 nm.

The content ratios and the property test results of the polymer samples obtained in Example 1 and Comparative Examples 1 to 5 are shown in Table 1 below.

TABLE 1

| | ISB | CHDM | DPCD | DDDA | DPC | ISB $c^1$-ISB | ISB $e^2$-ISB | CHDM $c^1$-CHDM | CHDM $e^2$-CHDM | $e^2$-CD | $e^2$-DD | cis/trans (%) | Tg (° C.) | $T^3$ (%) |
|---|---|---|---|---|---|---|---|---|---|---|---|---|---|---|
| Ex. 1 | 1 | 0 | 0.6 | 0 | 0.4 | 0.4 | 0.3 | 0 | 0 | 0.3 | 0 | 40/60 | 143 | 92 |
| Comp. Ex. 1 | 0.9 | 0.1 | 0.6 | 0 | 0.4 | 0.36 | 0.27 | 0.04 | 0.03 | 0.3 | 0 | 38/62 | 129 | 91 |
| Comp. Ex. 2 | 1 | 0 | 0 | 0 | 1 | 1 | 0 | 0 | 0 | 0 | 0 | — | 160 | 89 |
| Comp. Ex. 3 | 1 | 0 | 1 | 0 | 0 | 0 | 0.5 | 0 | 0 | 0.5 | 0 | 36/64 | 130 | 89 |
| Comp. Ex. 4 | 1 | 0 | 0 | 0.2 | 0.8 | 0.8 | 0.1 | 0 | 0 | 0 | 0.1 | — | 121 | 87 |
| Comp. Ex. 5 | 1 | 0 | 0.6 | 0 | 0.4 | 0.4 | 0.3 | 0 | 0 | 0.3 | 0 | 85/15 | 113 | 90 |

$^1$c, carbonate;
$^2$e, ester;
$^3$T, transmittance;
CD: cyclohexanedicarboxylate;
DD: dodecanedioate.

As shown in Table 1 above, when a bio-based polycarbonate ester was prepared from 1,4-diphenyl-cyclohexanedicarboxylate of formula 3 which was prepared according to the inventive method, the bio-based polycarbonate ester exhibits improved heat resistance as compared to a conventional biopolycarbonate prepared from 1,4:3,6-dianhydrohexitol and 1,4-cyclohexanedimethanol, although comprising the same amount of isosorbide. The inventive polycarbonate ester has an advantage that the amount of isosorbide in the polymer can be reduced owing to improved heat resistance.

Also, in case of Comparative Example 4, the optical transmittance level was dropped down from highly transparent poly(methyl methacrylate) (PMMA) level to a general BPA-based polycarbonate level due to the presence of a long chain aliphatic diacid which induces an increase in the photoelastic coefficient, and it was also found that the glass transition temperature was relatively low.

In particular, in case of Comparative Example 5, the glass transition temperature was significantly decreased as compared to Example 1 due to the high cis content of cyclohexanedicarboxylate unit in the polymer chain so obtained, and it was also confirmed that the optical transmittance level was reduced.

Accordingly, it is possible to control the properties deriving from the carbonate bond and the ester bond by adjusting the ratio thereof to give a desirable property according to its needs. Therefore, the polycarbonate ester prepared according to the present invention exhibits high heat resistance and transparency, and thus can be useful in various applications, e.g., glass alternative for automobile, optical lens and film, feeding bottle, food container, etc.

What is claimed is:

1. A bio-based polycarbonate ester consisting of:
a repeating unit represented by Formula 1:

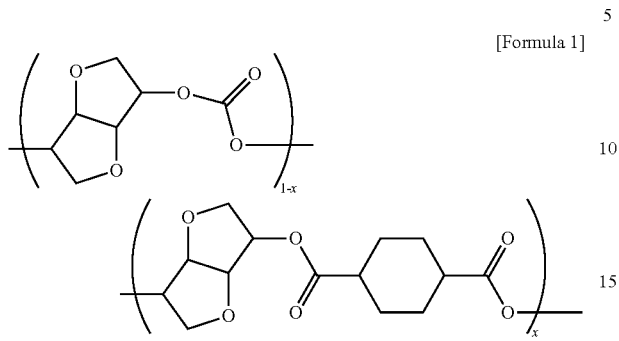

[Formula 1]

wherein x satisfies 0<x<1, and
wherein the ratio of cis/trans cyclohexanedicarboxylate unit is 20/80% to 80/20% in the repeating unit of Formula 1.

2. The bio-based polycarbonate ester of claim 1, wherein the ratio of cis/trans cyclohexanedicarboxylate unit is 30/70% to 70/30% in the repeating unit of Formula 1.

3. The bio-based polycarbonate ester of claim 1, wherein the ratio of cis/trans cyclohexanedicarboxylate unit is 40/60% in the repeating unit of Formula 1.

4. The bio-based polycarbonate ester of claim 1, wherein the 1,4:3,6-dianhydrohexitol is isosorbide.

* * * * *